(12) United States Patent
Fredlund et al.

(10) Patent No.: US 6,320,650 B1
(45) Date of Patent: Nov. 20, 2001

(54) POSITIONING APPARATUS FOR IMAGE CAPTURING APPARATUS

(75) Inventors: John R. Fredlund, Rochester; Richard G. Mackson, Pittsford, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/468,024

(22) Filed: Dec. 20, 1999

(51) Int. Cl.[7] .......................... G03B 27/62; G03B 27/52; G03B 27/58
(52) U.S. Cl. .................. 355/75; 355/40; 355/74
(58) Field of Search .............. 355/27–29, 40–41, 355/72–76; 358/474

(56) References Cited

U.S. PATENT DOCUMENTS

| | | | |
|---|---|---|---|
| 4,440,494 | 4/1984 | Wells | 355/100 |
| 4,523,831 | 6/1985 | Yokoo et al. | 355/3 R |
| 4,595,285 | 6/1986 | Miwa et al. | 355/75 |
| 4,659,214 | 4/1987 | Takemura et al. | 355/75 |
| 4,782,366 | 11/1988 | Lindsay | 355/40 |
| 4,816,921 * | 3/1989 | Akiyama et al. | 358/256 |
| 4,905,045 * | 2/1990 | Sasaki et al. | 355/229 |
| 4,970,547 | 11/1990 | Desai | 355/61 |
| 4,980,781 | 12/1990 | Yamamoto et al. | 358/474 |
| 5,177,535 * | 1/1993 | Watanabe | 355/230 |
| 5,574,542 | 11/1996 | Brook, III | 399/380 |
| 5,973,797 * | 10/1999 | Tanaka et al. | 358/488 |
| 6,147,743 * | 11/2000 | Fredlund et al. | 355/29 |

* cited by examiner

Primary Examiner—Russell Adams
Assistant Examiner—Hung Henry Nguyen
(74) Attorney, Agent, or Firm—Frank Pincelli

(57) ABSTRACT

A method and apparatus for capturing an image. The apparatus includes a support platen for receiving a document having a front image bearing side and a back side co-extensive with the front side. An image capture element is disposed below the platen for capturing an image on the front image side. A reticle forming device is provided for providing a reticle on the platen for assisting in positioning of the document when a positioning cover is placed over the document. A second cover is also provided for placement over the positioning cover. The second cover is substantially opaque and is used for when the image on the front image side is illuminating for capture of the image.

23 Claims, 6 Drawing Sheets

POSITIONING APPARATUS FOR IMAGE CAPTURING APPARATUS

FIELD OF THE INVENTION

The present invention relates to image capture devices which include image and document scanners transparent scanning service. More particularly, the present invention is directed to an improved apparatus for assuring positioning of a document on the scanning device.

BACKGROUND OF THE INVENTION

In a typical scanning device, there is provided a scanning service over which there is provided a cover which is used to hold and position the document to be scanned. A problem with prior art devices is that after the document is placed on the scanning platen, during positioning of the cover onto the platen, the document often moves which results in mis-positioning of the document. The operator of the scanner is forced to position the document without knowing if the positioning is correct until the scanning is previewed or the scan is complete. Often the image will be physically rotated from its position as established by the operator before the cover is placed over the image. This mis-positioning of the document results in scanning of only a portion of the original document and/or scanning the wrong portion of the image on the document. Alternatively, the operator must correct the mis-positioning after the scan is complete, which is a tedious and time-consuming operation. Since the scanned image is often printed, uncorrected positioning may result in an undesirable and/or useless copy. Another problem associated with prior art devices is that it is often difficult to determine where on the platen to properly place the document. This again results in obtaining undesirable or useless copies of the scanned image.

The present invention provides an improved apparatus whereby a document can be accurately placed upon the scanning platen and positioned securely such that before the actual scanning or copying mode. Thus the appropriate area to be copied is obtained without multiple tries.

SUMMARY OF THE INVENTION

In accordance with one aspect of the present invention there is provided an apparatus for capturing an image, comprising:
  a. a support platen for receiving a document having a front image bearing side and a back side co-extensive with the front side;
  b. an image capture element disposed below the platen for capturing an image on the front image side;
  c. a first light source for illuminating the document such that at least one distinguishing feature of the document is visible so that the document can be positioned on the platen;
  d. a first positioning cover designed for placement over the document, the first positioning cover being made of material such that at least one distinguishing feature of the document can be viewed through the first positioning cover when the first light source is illuminated; and
  e. a second cover for placement over the first positioning cover, the second cover being substantially opaque and used for when the image on the front image side is illuminating for capture of the image.

In accordance with another aspect of the present invention there is provided an apparatus for capturing an image, comprising:
  a. a support platen for receiving a document having a front image bearing side and a back side co-extensive with the front side;
  b. an image capture element disposed below the platen for capturing an image on the front image side;
  c. a first positioning cover designed for placement over the document, the first positioning cover being made of material such that the position of the document can be viewed through the first positioning cover; and
  d. a reticle forming device for producing a reticle on the first positioning cover so that the document can be positioned on the platen.

In accordance with yet another aspect of the present invention there is provided a method of positioning a document on an image capture apparatus, the apparatus having a platen on which a document may be placed for scanning, comprising the steps of:
  a. placing a document on the platen, the document having a front image bearing side and a back side co-extensive with the front side;
  b. placing a first position cover over the document, the first position cover being made of material such that the at least one distinguishing feature of the document can be viewed through the first position cover when the first light source is illuminated; and
  c. illuminating the document such that at least one distinguishing feature of the document is visible so that the document can be positioned on the platen.

In still another aspect of the present invention there is provided a method of positioning a document on an image capture apparatus, the apparatus having a platen on which a document may be placed for scanning, comprising the steps of:
  a. placing a document on the platen, the document having a front image bearing side and a back side co-extensive with the front side;
  b. placing a first position cover over the document, the first position cover being made of material such that the document can be viewed through the first position; and
  c. illuminating the document with a reticle so that the document can be positioned on said platen.

BRIEF DESCRIPTION OF THE DRAWINGS

The features of the present invention will be best understood from a detailed description of the invention and a preferred embodiment thereof selected for the purpose of illustration is shown in the accompanying drawings in which:

FIG. 4 is a view similar to FIG. 3 illustrating the positioning cover over the document with a position lamp on;

DETAILED DESCRIPTION OF THE INVENTION

Figure 1:
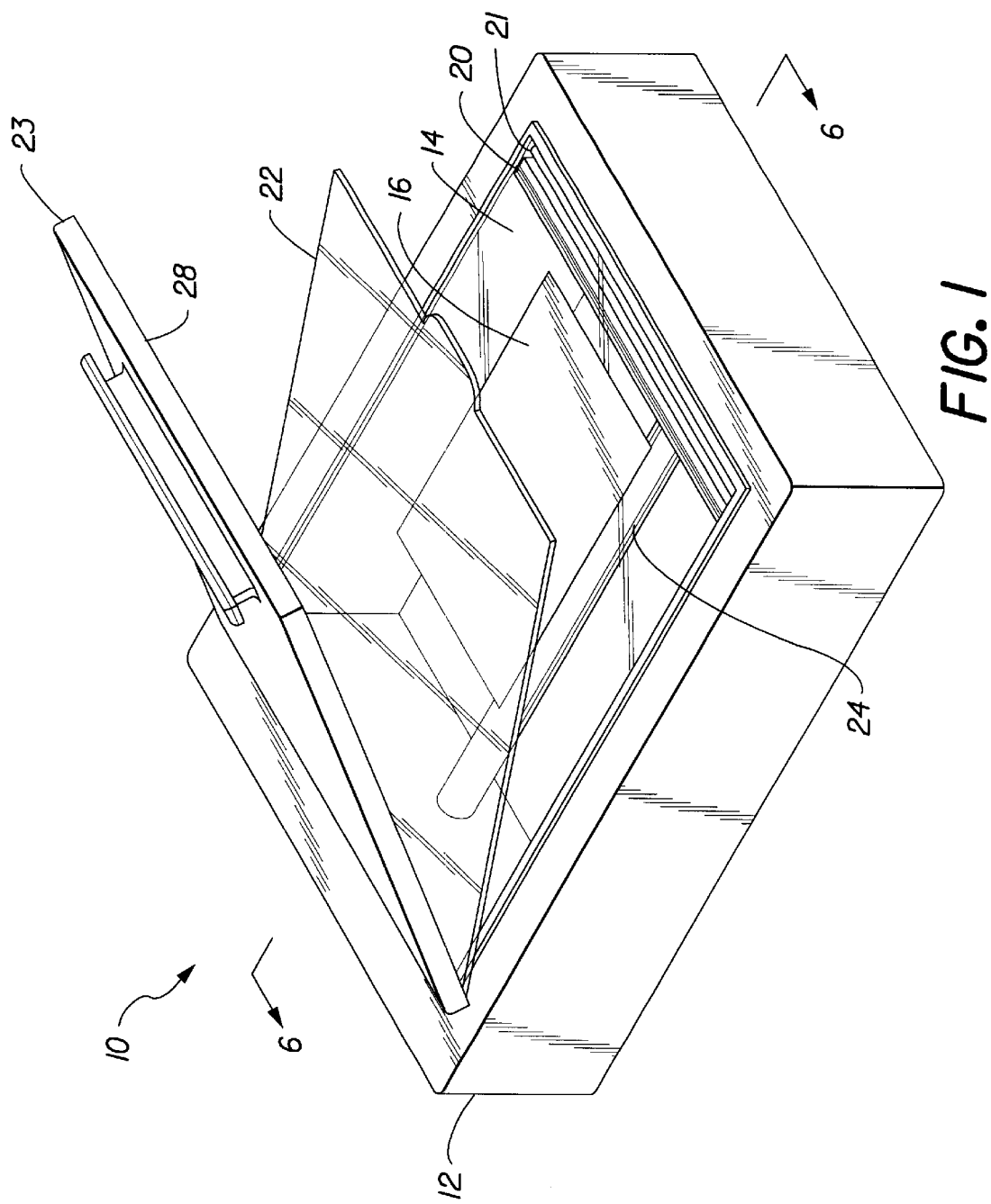
FIG. 1 is a perspective view of an apparatus made in accordance to the present invention.
Figure 2:
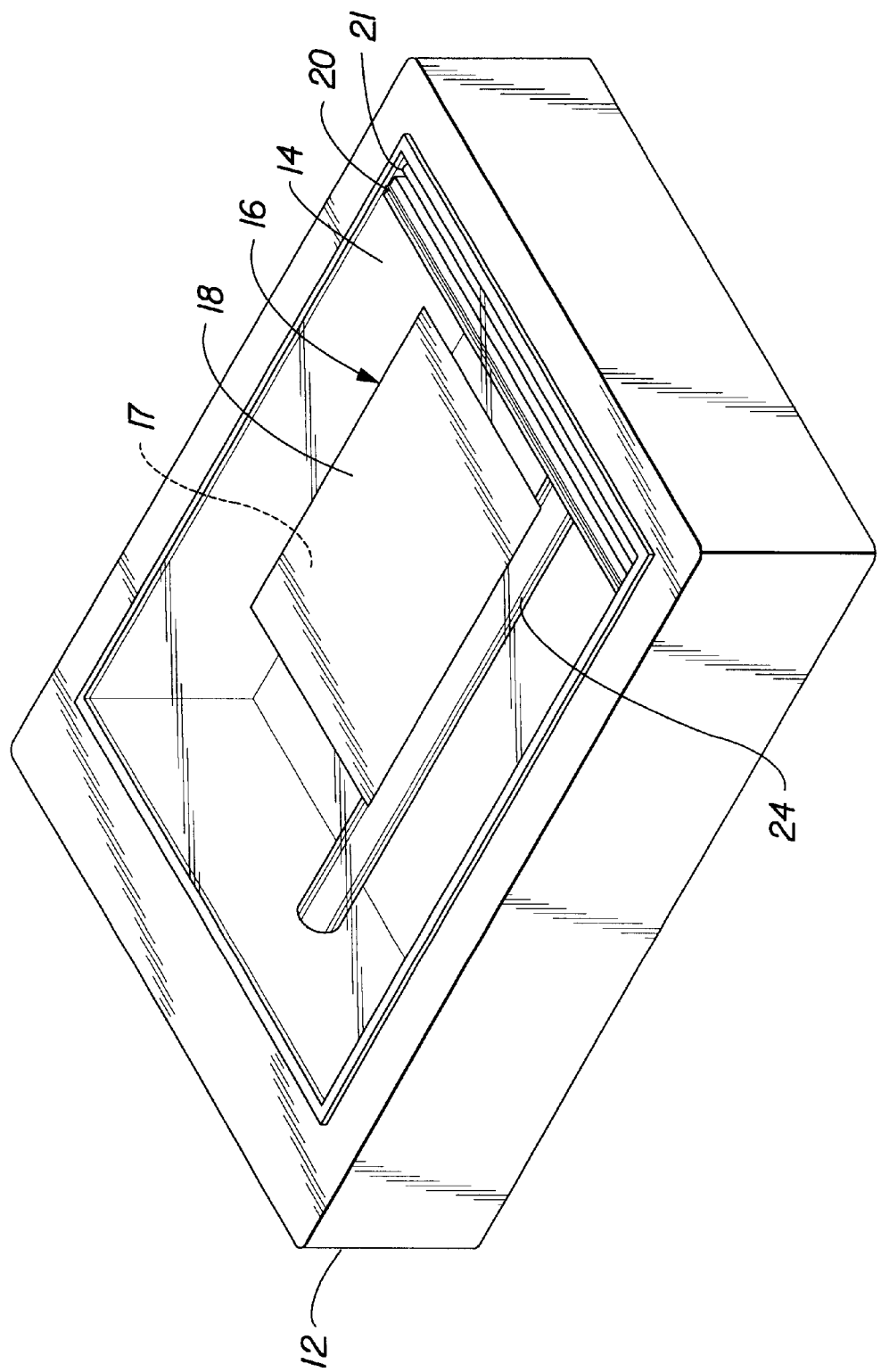
FIG. 2 is a perspective view of the base portion of the apparatus of FIG. 1 illustrating a document to be copied thereon the scanning platen service.
Figure 3:
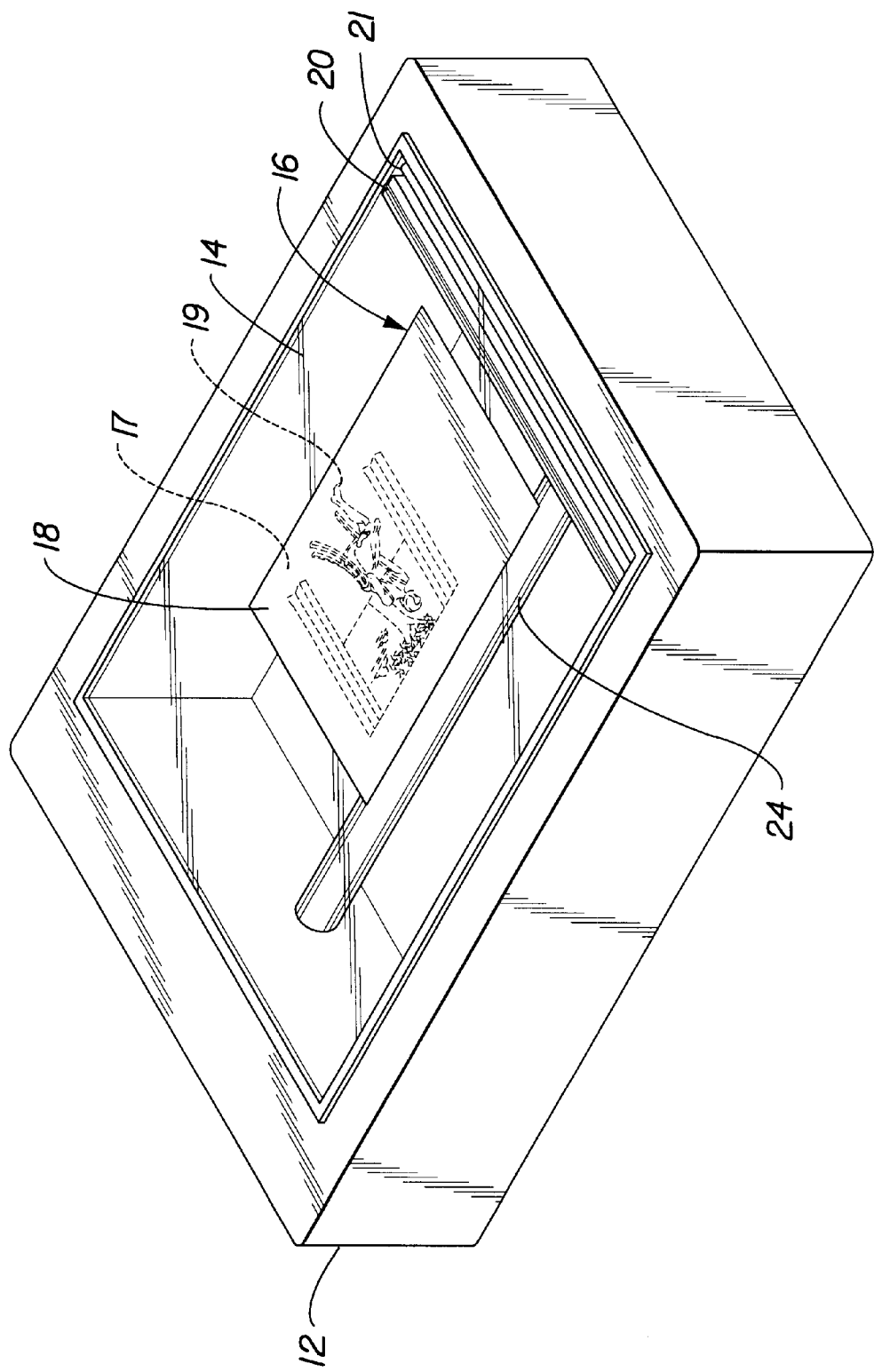
FIG. 3 is a view similar to FIG. 2 illustrating a positioning light activated.

Referring to FIGS. 1–5 there is illustrated an apparatus 10 made in accordance with the present invention. The apparatus 10 may be a scanner and/or copying device as is well known in the prior art. The apparatus includes a housing 12 having a scanning platen 14 on which a document 16 may be placed for scanning. The document 16 has a front side 17 which placed on platen 14 and back side 18 co-extensive with the front side. The front side 17 typically has an image 19 that is to be scanned. The document 16 may be made of any appropriate material. In the embodiment illustrated, the document is a photographic print made of conventional photographic paper. The apparatus 10 in the embodiment illustrated, is a digital scanner which includes an image sensor 20 and a scanning lamp 21. The image sensor 20 and scanning lamp 21 are moved underneath the platen 14 such that a copy of image 19 (see FIG. 3) on document 16 may be obtained. While in the particular embodiment illustrated, the image sensor 20 and scanning lamp 21 are moved, it is to be understood that any type of scanning arrangement may be used for capturing of the image 19 on the document 16.

Figure 4:
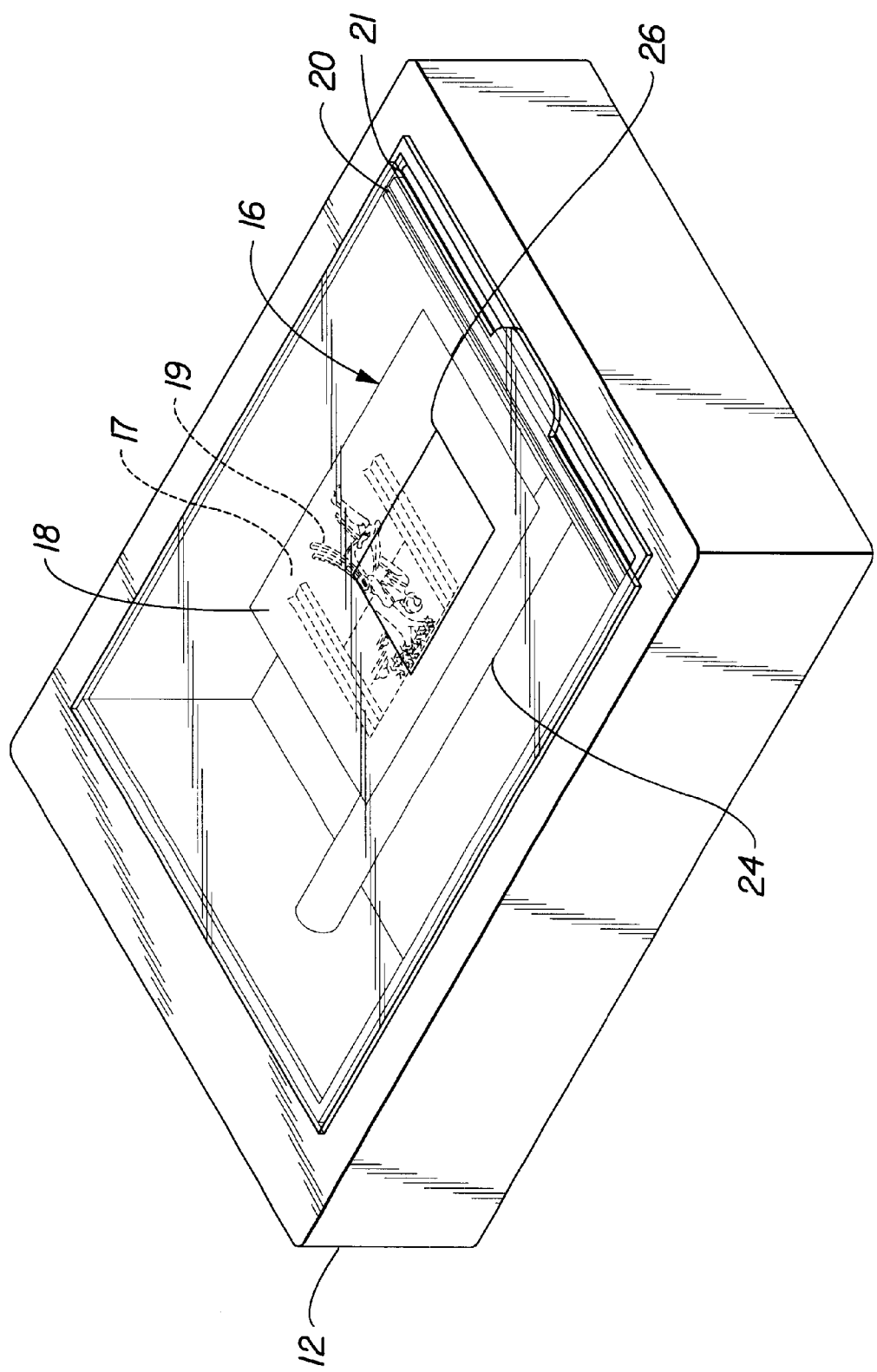

The apparatus 10 includes a positioning cover 22 that is placed over the document 16 after the document has been placed on the scanning platen 14. A light protective cover 23 is provided for placement over cover 22 for blocking scanning light from leaving apparatus 10. In the preferred embodiment illustrated, the position cover 22 is made of a substantially transparent and/or translucent cover such that the positioning of the document 16 may be obtained. An optional second lamp 24 is provided for confirming and positioning of the document 16 when the positioning cover is placed over the document 16 as illustrated in FIG. 4. The positioning cover 22 is provided with a reticle 26 which can be used for positioning of the image 19. In particular, as illustrated in FIG. 4 the document 16 is made of a material such that a sufficient amount of light from lamp 24 will pass through document 16 and cover 22. Preferably the light from lamp 24 is of an intensity such that at least one feature of the image 19 may be recognized through the document 16 as illustrated in FIG. 4. The intensity of the light from lamp 24 will cause two things to happen; first, it will enable a reticle that is provided in the cover 22 to be visible, and secondly, the light provided by lamp 24 will also allow a at least one feature of the image 19 on the document 16 to be viewed. Thus, the position of document 16 can be determined with respect to the position of the reticle and also the orientation or selected portion of the image 19 on the document can be identified. Additionally, the position of the image 19 residing on the document 16 can be determined with respect to the position of reticle. In the preferred embodiment, the positioning cover 22 is transparent for ease in viewing the reticle and the image on the document. Also in the embodiment illustrated, the reticle is embedded in cover 22 and is made of a material such that it does not interfere with scanning of the image. In this regard, the reticle 26 may be made of a color such that it can only be viewed when the lamp 24 is activated. For example, but not by way of limitation, the lamp 24 may be a black light (i.e. one lamp that emits ultra violet light, light having a wavelength shorter than 380 nm.) that causes the reticle to be activated and viewed. Alternatively the reticle 26 may be provided in a color which is substantially the same as the inward facing surface 28 of a light protective cover 23 which is used to be placed over the positioning cover 22 when actual capturing of the image on the document occurs.

In the particular embodiment illustrated, the reticle and the inward facing surface 28 of light protective cover 23 preferably have a substantially white color so that substantially no color from the reticle will be picked up by image sensor 20. Additionally, a single lamp providing two different light intensities may be substituted for lamps 24 and 21.

In the particular embodiment illustrated the reticle 26 is illustrated as being a substantially rectangular outline. However, this it to be understood that the reticle may be provided in many particular desired formats. For example, but not by way of limitation the reticle may be in the form of a grid pattern which may or may not be directed to a single or plurality of particular size documents such as letter, legal etc.

Figure 5:
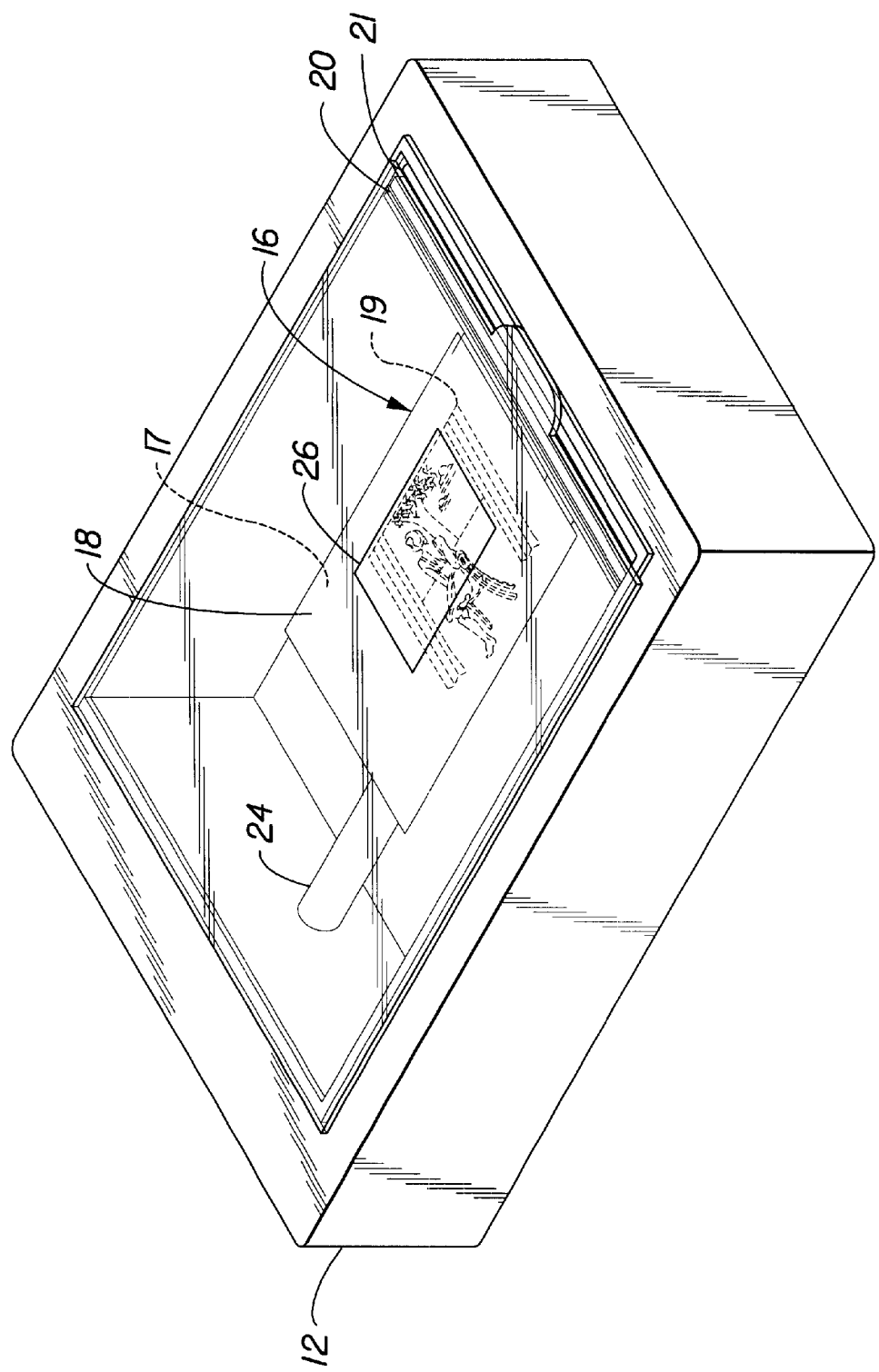
FIG. 5 is a view similar to FIG. 4 illustrating the document after it has been repositioned.

In order to better understand the present invention the following is a description of the operation of apparatus 10. First as illustrated in FIG. 1, a document 16 is placed on the scanning platen 14. Thereafter positioning cover 22 is placed over the document 16. Thereafter lamp 24 is activated so that reticle 26 on the positioning cover 22 and at least one feature of the image 19 may be viewed. A switch, not shown, may be provided for manually turning on and/or off the lamp 24 as required by the operator. If the document 16 is not properly positioned such as illustrated in FIG. 4, the document 16 is then repositioned as illustrated in FIG. 5. Once the document 16 has been properly positioned, the lamp 24 is turned off. Thereafter the light protective cover 23 is placed over the positioning cover 22 and activation of the scanning lamp 21 is commenced for scanning of the document 16. Thus it can be seen that since the document 16 has been properly positioned, the exact area to be scanned and/or copied is obtained so that the image on the document 16 will be properly obtained without any unnecessary repetition or re-scanning of the document 16 and/or reprinting. Alternatively, in place of a manual switch, the action of placing the protective cover 23 over the positioning cover 22 may automatically turn off lamp 24. In yet another modification of the present invention, if the light from lamp 24 does not interfere with the scanning operation, lamp 24 may remain on during scanning.

Figure 6:
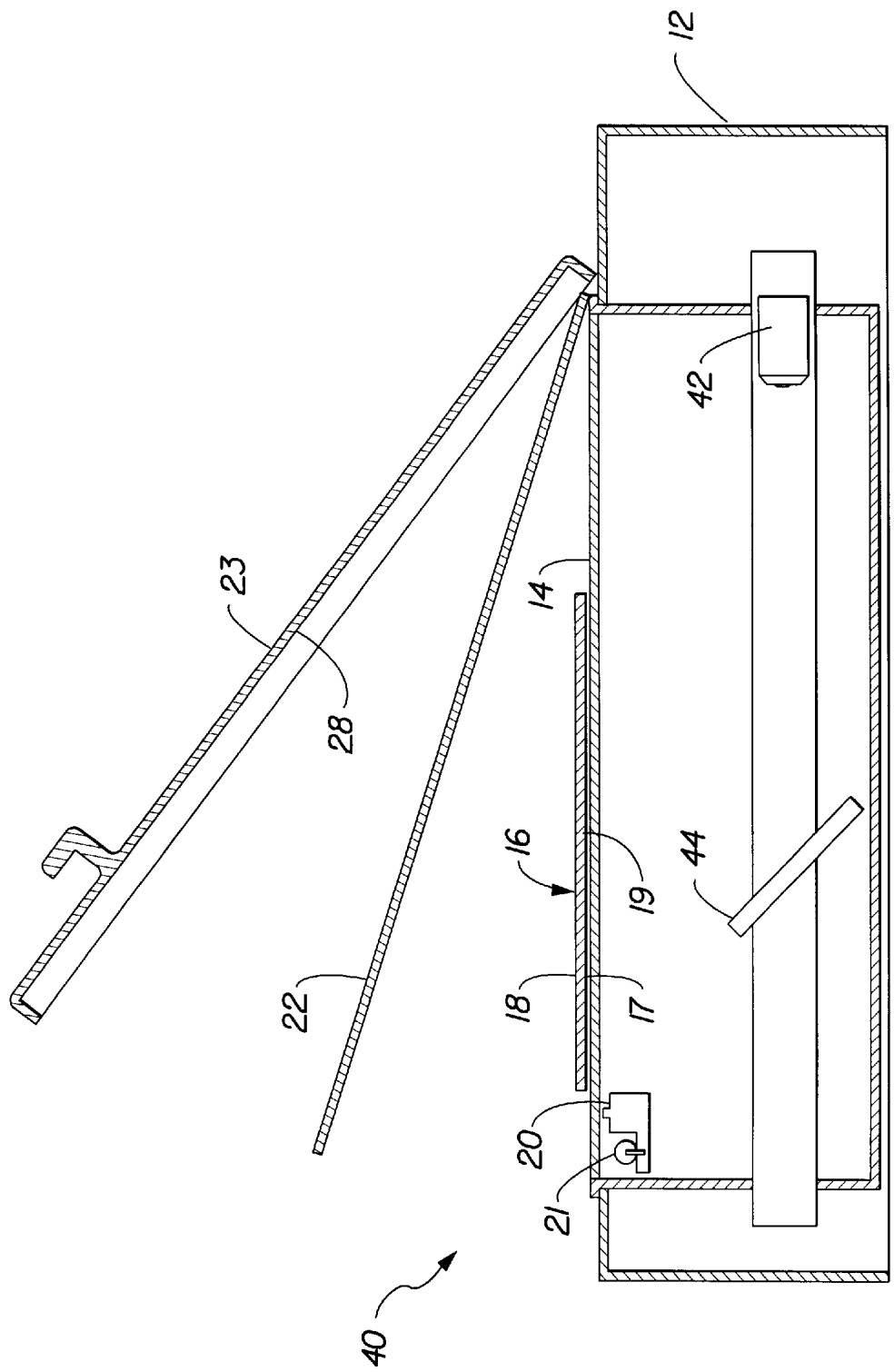
FIG. 6 is a cross-sectioned view of a modified apparatus made in accordance to the present invention shown as taken along lines 66 of FIG. 1.

Referring to FIG. 6 there is illustrated a modified apparatus 40 made in accordance to the present invention, apparatus 40 is similar to apparatus 10, like numerals indicating like parts and operation. However, in this embodiment instead of the reticle is provided by, a laser 42 which shines onto a mirror 44 which produces the reticle 26 onto document 16 and is of sufficient brightness that it may be viewed through the document 16. The laser 42 may be properly controlled to provide a variety of different reticles depending upon how the apparatus 40 is programmed. In particular, depending upon whether the entire image on the document is to be captured, or whether there is to be an enlargement, the reticle may be adjusted to correspond exactly to the desired shape and positioning in which the document 16 should be placed on platen 14. The laser 42 may provide infinite selection of patterns for use in identifing the desired portion of the document to be captured.

It is to be understood that various changes and modifications may be made without departing from the scope of the present invention, the present invention being defined by the following claims.

PARTS LIST 10. apparatus
12. housing
14. scanning platen
16. document
17. front side
18. back side
19. image
20. image sensor
21. scanning lamp 22. positioning cover
23. light protective cover
24. lamp
26. reticle
28. surface
40. apparatus
42. laser
44. mirror

What is claimed is:

1. An apparatus for capturing an image, comprising:
   a. a support platen for receiving a document having a front image bearing side and a back side co-extensive with the front side;
   b. an image capture element disposed below said platen for capturing an image on said front image side, said image having at least one distinguishing feature;
   c. a first light source for illuminating said document such that at least one distinguishing feature of said image is visible so that said document can be positioned on said platen;
   d. a first positioning cover designed for placement over said document, said first positioning cover being made of material such that said at least one distinguishing feature of said image can be viewed through said first positioning cover when said first light source is illuminated prior to capturing of said image; and
   e. a second cover for placement over said first positioning cover, said second cover being substantially opaque and used for when said image on said front image side is illuminated for capture of said image.

2. An apparatus according to claim 1, wherein a reticle is provided on said first positioning cover.

3. An apparatus according to claim 1, wherein said first light source may be activated to a first and second light intensities, said first light intensity being less than said second light intensity, said first light intensity being used when positioning of said document on said platen and said second light intensity being used for capturing of said image.

4. An apparatus according to claim 1, further comprising a single light source used both for position and scanning of said image.

5. An apparatus according to claim 1, further comprising a second light source for use in capturing said image, said first light source providing a light at a first light intensity for positioning of said document, said second light source providing a light at a second light intensity for capturing of said image.

6. An apparatus according to claim 5, further comprising a switch for placing said apparatus in a positioning mode for activation of said first light source at said first light intensity.

7. An apparatus according to claim 1, further comprising a switch for turning on and/or off said positioning light source when the second substantially opaque cover is closed.

8. An apparatus according to claim 1, wherein in said first positioning cover is transparent.

9. An apparatus according to claim 1, wherein said first positioning cover is flexible.

10. An apparatus according to claim 1, wherein a positioning reticle is provided on said positioning cover.

11. An apparatus according to claim 10 where in said reticle is the same color as said second cover.

12. An apparatus according to claim 1, wherein a reticle is placed on said first positioning cover, said reticle having a color that will not be viewed until activated by a light source of a specific light frequency.

13. An apparatus according to claim 9, wherein said light source comprises a light source emitting a light having a wavelength shorter than 380 nm.

14. An apparatus for capturing an image, comprising:
   a. a support platen for receiving a document having a front image bearing side and a back side co-extensive with the front side;
   b. an image capture element disposed below said platen for capturing an image on said front image side, said image having at least one distinguishing feature;
   c. a first positioning cover designed for placement over said image, said first positioning cover being made of material such that the position of said document can be viewed through said first positioning cover; and
   d. a reticle forming device for producing a reticle on said first positioning cover so that said image can be positioned on said platen.

15. An apparatus according to claim 14 further comprising a second cover for placement over said first position cover, said second cover being substantially opaque and used for when said image on said front image side is illuminating for capture of said image.

16. An apparatus according to claim 14 wherein said reticle forming device comprises a laser which produces said reticle.

17. An apparatus according to claim 14 wherein a reticle is placed on said first positioning cover, said reticle having a color that will not be viewed until activated by a light source of a specific light frequency, wherein said positioning cover includes a reticle that is a visible reticle forming device comprising a light source.

18. A method of positioning a document on an image capture apparatus, said apparatus having a platen on which a document may be placed for scanning, comprising the steps of:
   a. placing a document on said platen, said document having a front image bearing side and a back side co-extensive with the front side;
   b. placing a first position cover over said document, said first position cover being made of material such that said at least one distinguishing feature of said image can be viewed through said first position cover when said first light source is illuminated; and
   c. illuminating said document such that at least one distinguishing feature of said image is visible so that said image can be positioned on said platen.

19. A method according to claim 18 further comprising the step of:
   d. placing a second cover over said first position cover, said second cover being substantially opaque and used for when said image on said front image side is illuminating for capture of said image; and
   e. illuminating said document so as to capture said image on said document.

20. A method of positioning a document on an image capture apparatus, said apparatus having a platen on which a document may be placed for scanning, comprising the steps of:
   a. placing a document on said platen, said document having a front image bearing side and a back side co-extensive with the front side, said front side having an image having at least one distinguishable feature;
   b. placing a first position cover over said document, said first position cover being made of material such that said image can be viewed through said first position; and
   c. illuminating said document with a reticle so that said image can be positioned on said platen.

21. A method according to claim 20 further comprising the step of repositioning said document if it is not positioned properly on said platen.

22. A method according to claim 21 further comprising the step of placing said positioning cover again on said document and illuminating said document with said reticle again to determine if said document is properly positioned.

23. A method according to claim 20 further comprising the step of:

a. placing a second cover over said first position cover, said second cover being substantially opaque and used for when said image on said front image side is illuminating for capture of said image; and b. illuminating said document so as to capture said image on said document.

\* \* \* \* \*